United States Patent [19]
Walker

[11] 3,783,614
[45] Jan. 8, 1974

[54] TURBINE ENGINE

[76] Inventor: Harold L. Walker, P.O. Box 185, Finch, Ontario, Canada

[22] Filed: Feb. 10, 1972

[21] Appl. No.: 225,121

[52] U.S. Cl. ............... 60/39.18 R, 60/38, 60/39.08, 60/39.66, 62/467
[51] Int. Cl. ............................................. F02g 5/00
[58] Field of Search ............... 60/39.18 R, 39.18 A, 60/39.18 B, 39.18 C, 39.08, 38, 39.66; 62/467

[56] References Cited
UNITED STATES PATENTS

| | | | |
|---|---|---|---|
| 3,007,306 | 11/1961 | Martin et al. | 60/39.18 R |
| 3,312,056 | 4/1967 | Lagelbauer | 60/39.18 R |
| 3,668,884 | 6/1972 | Nebgen | 62/467 |
| 3,355,883 | 12/1967 | Beam | 60/39.66 |
| 3,550,372 | 12/1970 | Craig | 60/39.66 |
| 3,024,366 | 3/1962 | Yanagimachi | 62/467 |
| 3,266,246 | 8/1966 | Heller | 60/38 |
| 2,820,599 | 1/1958 | Ackeret et al. | 60/224 X |

FOREIGN PATENTS OR APPLICATIONS

| | | | |
|---|---|---|---|
| 279,734 | 12/1951 | Switzerland | 60/39.18 A |

*Primary Examiner*—Carlton R. Croyle
*Assistant Examiner*—Warren Olsen
*Attorney*—Albert C. Nolte, Jr. et al.

[57] ABSTRACT

A turbine engine of conventional compressor, combustion chamber, power turbine type has a fluoro carbon cooling system. The cooling system comprises a heat exchanger formed by passages through the turbine of the basic engine in which heat is exchanged between the heated and expanded air of the basic engine and the fluoro carbon and from which the expanded fluoro carbon is directed through a cooling system turbine to produce power. From the cooling system turbine the fluoro carbon is directed to a condenser which is in fact constituted by the compressor of the basic engine and then returned through a compressor to the heat exchanger so that effective cooling of the basic engine is achieved and power is derived from the heat of the exhaust gases of the basic engine to be applied to the fluoro carbon turbine.

3 Claims, 2 Drawing Figures

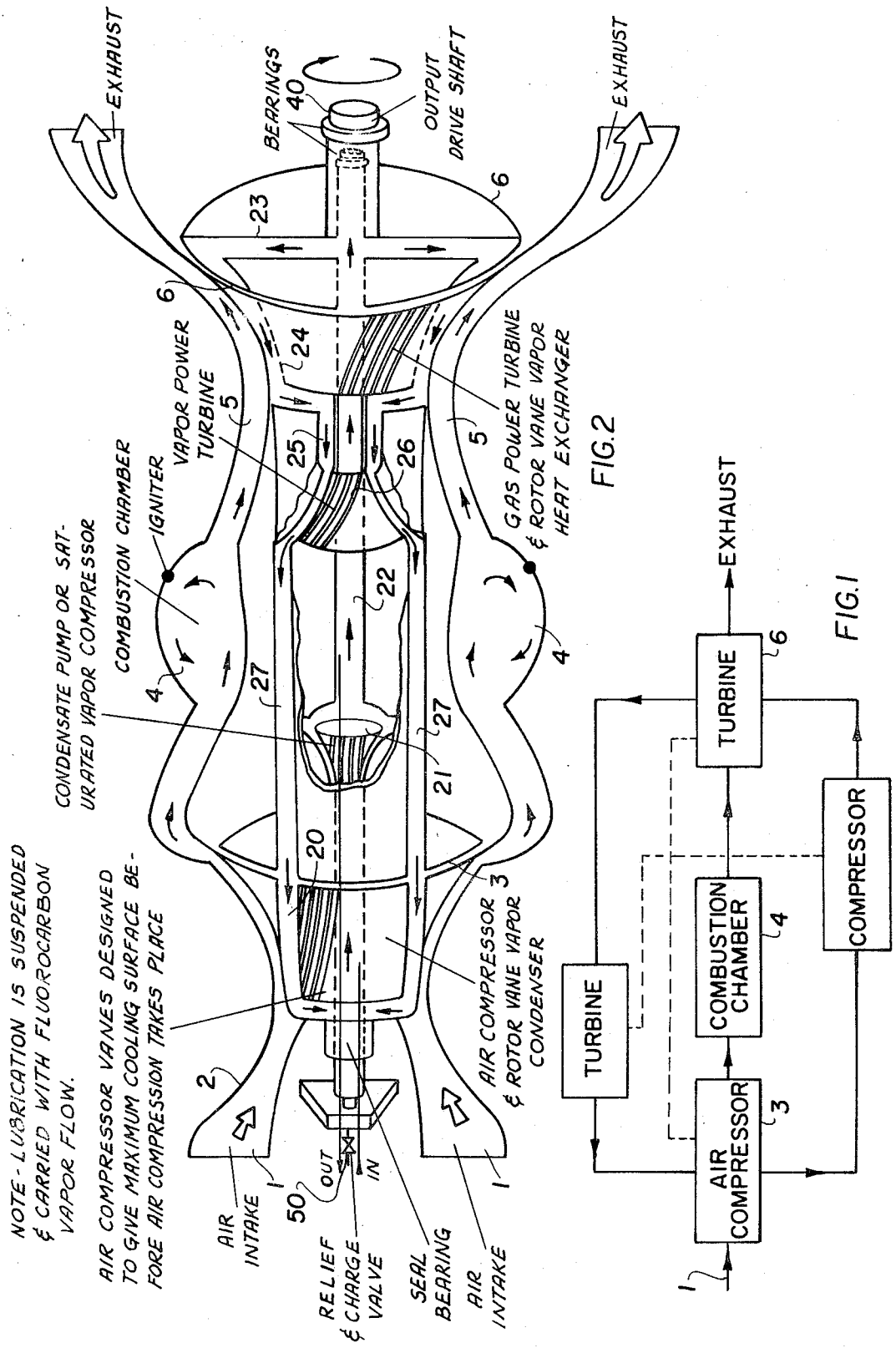

TURBINE ENGINE

This invention is concerned with turbine engines of the compressor/combustion chamber turbine type and is particularly concerned to provide an engine in which effective cooling is achieved and in which additional power is derived from the cooling system.

According to this invention there is provided a turbine engine with a cooling system employing a fluoro carbon or other refrigerant which is expanded, by vaporization, and condensed and during that expansion and condensing cycle is caused to pass through a turbine which preferably is mounted upon a shaft common to the compressor/turbine shaft of the basic turbine engine. The vaporization is effected by passing the refrigerant through passages formed in the turbine of the basic engine. In this way, additional power is derived from what would normally be the exhaust gases of the basic engine and effective cooling of the basic engine turbine is achieved.

An embodiment of this invention is illustrated, schematically, in the accompanying drawings, in which:

FIG. 1 shows a scheme arrangement of the flow paths in block form; and

FIG. 2 is a scheme view more closely relating the physical relationship of the various elements of the arrangement of FIG. 1.

An air intake 1 communicates, via ducting 2, with a compressor 3, in this instance illustrated as a centrifugal type compressor, whence compressed air is led to a combustion chamber 4. The expanded products of combustion are led, by a ducting 5, to a turbine 6 and then are exhausted through ducting 7. This being a largely conventional turbine engine system.

The cooling system of the present invention comprises a condenser which is constituted by passageways 20 formed in the air compressor 3 of the basic engine. From the condenser/compressor the condensed refrigerant is directed to a compressor 21 mounted upon shaft 40 which is common to the compressor and turbine of the basic engine. The compressed refrigerant is then led through an axial passage 22 to a heat exchanger which is constituted by passageways 23 and 24 formed in the turbine 6 of the basic engine at which the refrigerant picks up heat from the products of combustion turning the turbine and cools the turbine and its associated journals and vanes. From the heat exchanger/turbine and expanded refrigerant is led through ducting 25 to pass through a turbine 26 which is mounted on common shaft 40 to apply power to that turbine and is then returned through ducting 27 to the condensor/compressor.

It will be appreciated that in this way the cooling system not only effectively cools the basic engine but by passing the expanded refrigerant through the turbine 26 power is derived from the exhaust gases of the basic engine.

The refrigerant circuit includes a relief and charging valve 50 by which the supply of refrigerant may be replenished or by which pressure in the cooling system may be relieved. Additionally, it is considered desirable that the fluoro carbon refrigerant should include a lubricant suspended therein so that shaft bearings and turbine bearings may be effectively lubricated by the cooling system.

It will be appreciated that the device as disclosed is subject to various modifications which do not deviate from the scope of the invention. For example, refrigerants other than fluoro carbons can be used. In particular applications mercury or water may be preferred over fluoro-carbon and in such applications it is to be appreciated that the refrigerant compressor would take an appropriate form, such as for example it may be a saturated vapor compressor or a condensate pump.

Additionally, by inserting the inlet and outlet passages indicated on the left hand side of FIG. 1, the device can be effectively used for air condition applications.

Clearly where the device is used in aircraft then automatically it would de-ice at high altitudes and if used in the desert the fluoro carbon flow could be reversed to cool intake air.

What is claimed is:

1. A turbine engine comprising a main shaft an air compressor rotating with said shaft and connected to deliver compressed air to a heating unit said heating unit being connected to deliver expanded air to a power turbine mounted for rotation with said shaft, and a closed circuit cooling system containing a refrigerant comprising, in order, a refrigerant condenser connected to deliver condensed refrigerant to a refrigerant compressor, said refrigerant compressor being connected to deliver compressed and condensed refrigerant to a heat exchanger, said heat exchanger being connected to deliver refrigerant to a refrigerant-driven turbine, wherein said heat exchanger is constituted by said power turbine, said condenser is constituted by passageways through said air compressor, said refrigerant compressor and said refrigerant-driven turbine being mounted for rotation with said shaft whereby the refrigerant is heated by the expanded air, the power turbine cooled and power derived by the application of expanded refrigerant to said cooling system refrigerant-driven turbine.

2. An engine as claimed in claim 1 in which said refrigerant is a fluoro carbon.

3. An engine as claimed in claim 1 wherein said refrigerant has a lubricant suspended therein for supplying lubricant to running parts of said engine.

* * * * *